July 7, 1925.

Re. 16,107

LE ROY P. CLUTTER ET AL

POWER SHOVEL

Original Filed May 2, 1922 4 Sheets-Sheet 1

INVENTORS.
LE ROY P. CLUTTER
BIRD C. CLUTTER
BY G. L. Ely
ATTORNEY.

July 7, 1925.

LE ROY P. CLUTTER ET AL

Re. 16,107

POWER SHOVEL

Original Filed May 2, 1922 4 Sheets-Sheet 2

INVENTORS.
LE ROY P. CLUTTER
BIRD C. CLUTTER

BY

G. C. Ely

ATTORNEY.

July 7, 1925.

LE ROY P. CLUTTER ET AL

Re. 16,107

POWER SHOVEL

Original Filed May 2, 1922 4 Sheets-Sheet 3

INVENTORS.
LE ROY P. CLUTTER
BIRD C. CLUTTER

BY G. E. Ely.

ATTORNEY.

July 7, 1925.

LE ROY P. CLUTTER ET AL

Re. 16,107

POWER SHOVEL

Original Filed May 2, 1922 4 Sheets-Sheet 4

INVENTORS.
LE ROY P. CLUTTER
BIRD C. CLUTTER.

BY G. L. Ely
ATTORNEY.

Reissued July 7, 1925

Re. 16,107

UNITED STATES PATENT OFFICE.

LE ROY P. CLUTTER, OF WASHINGTON, PENNSYLVANIA, AND BIRD C. CLUTTER, OF AKRON, OHIO, ASSIGNORS OF ONE-THIRD TO GEORGE W. WAGNER, OF BEAVER FALLS, PENNSYLVANIA.

POWER SHOVEL.

Original No. 1,522,768, dated January 13, 1925, Serial No. 557,852, filed May 2, 1922. Application for reissue filed March 7, 1925. Serial No. 13,924.

*To all whom it may concern:*

Be it known that we, LE ROY P. CLUTTER and BIRD C. CLUTTER, citizens of the United States, residing at Washington, in the county of Washington and State of Pennsylvania, and Akron, county of Summit, and State of Ohio, respectively, have invented certain new and useful Improvements in Power Shovels, of which the following is the specification.

This invention relates to power shovels or excavators adapted to be operated by a steam or internal combustion engine, electric motor, or any other suitable driving means, and has for its primary object to provide a machine of such class which may be successfully operated in very restricted places, such as mines, tunnels, basements or in spaces impeded with poles, lines, posts, etc.

A further object of the invention is to provide a machine of such class without the use of an ordinary boom thus obviating the employment of counterweights, and to further provide a very powerful machine of the class referred to which is comparatively light in structure and very compact.

A further object of the invention is to provide a machine of such class, in a manner as hereinafter set forth, with power scoop or shovel having an unusually high dumping elevation, as well as with a straight forward thrust, thus making it possible to leave the bed or work with an excellent grade, as well as with square corners and vertical slopes.

A further object of the invention is to provide a machine of the class referred to, whereby its operating mechanism, including engine, drums, clutches and various other parts of such mechanism is located back of the center pin (upon which the body of the machine swings) thereby increasing its ability to lift heavy loads, and, as the employment of the ordinary boom in such types of machines is dispensed with, it enables the operation of the machine extremely close to the work or excavation.

A further object of the invention is to provide a machine of the class referred to, with a scoop or shovel provided with a rearwardly extending arm or traveling boom, which is adapted to be projected from within the machine outwardly therefrom and to be withdrawn into the machine, whereby the machine can be positioned in close proximity to the work or excavation, and to further pivotally support said arm at its rear end whereby it can be shifted to any desired inclination when projected.

A further object is to provide in a revolvable power shovel a pivoted arm or boom for carrying the scoop the pivot of which is movable from directly over or to the rear of the center of revolution of the shovel forwardly thereof to project the arm or boom forwardly from the shovel.

A further object is to provide in a shovel as set forth in the next preceding paragraph a power unit, boom operating mechanism, etc., all mounted rearwardly of the center of revolution of the shovel.

Still further objects of the invention are to provide a machine of the type stated which is simple in its construction and arrangement, strong, durable and efficient in its use, and comparatively inexpensive to manufacture.

To the accomplishment of these and such other objects as may hereinafter appear, the invention consists of the novel construction, combination and arrangement of parts, herein specifically described and illustrated in the accompanying drawings wherein is shown an embodiment of the invention, but it is to be understood that changes, variations and modifications may be resorted to which come within the scope of the claims hereunto appended.

In the drawings forming a portion of this specification and wherein like numerals of reference designate corresponding parts throughout the several views.

Figure 1:
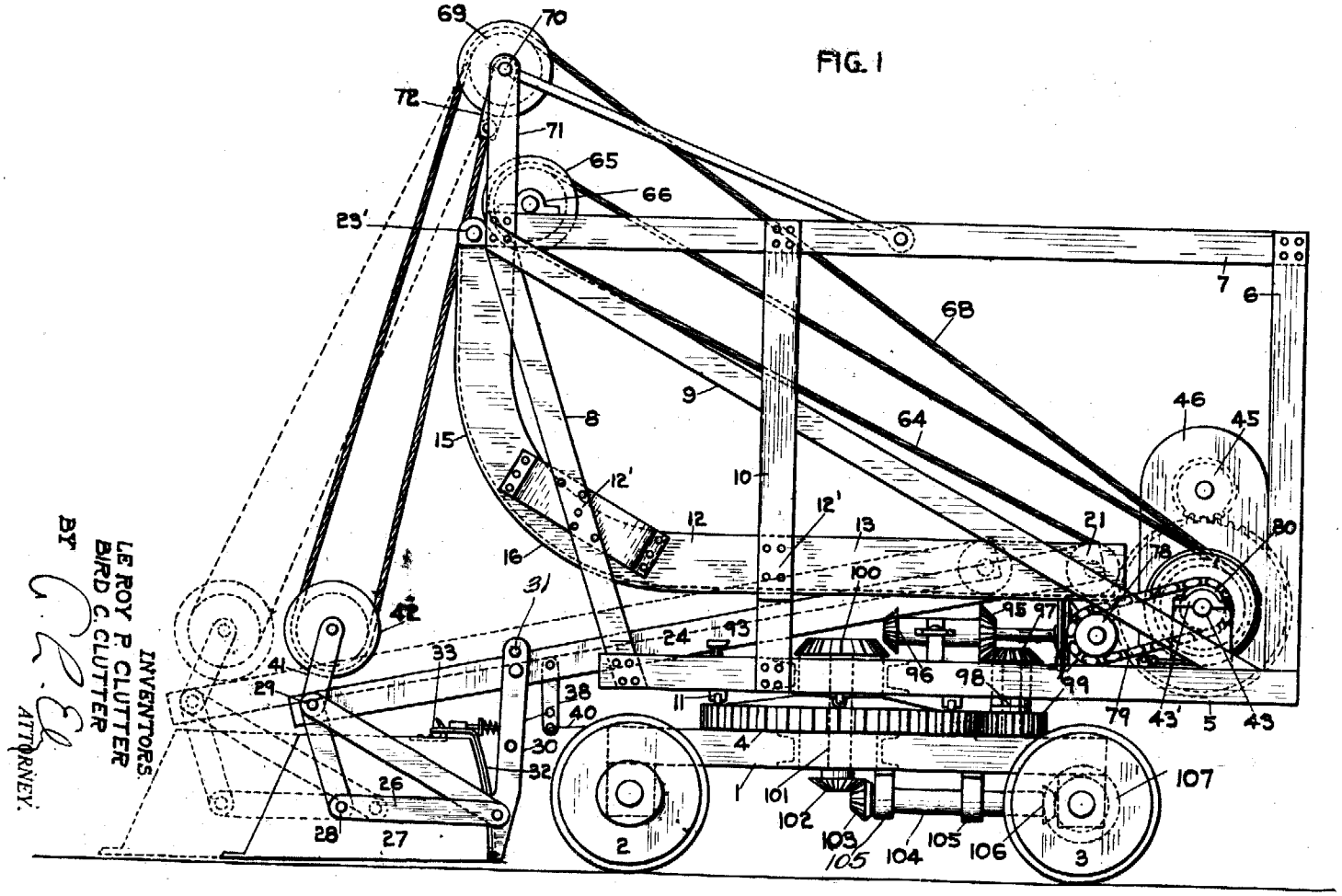
Figure 1 is a side elevation of a power shovel constructed in accordance with this invention.
Figure 2:
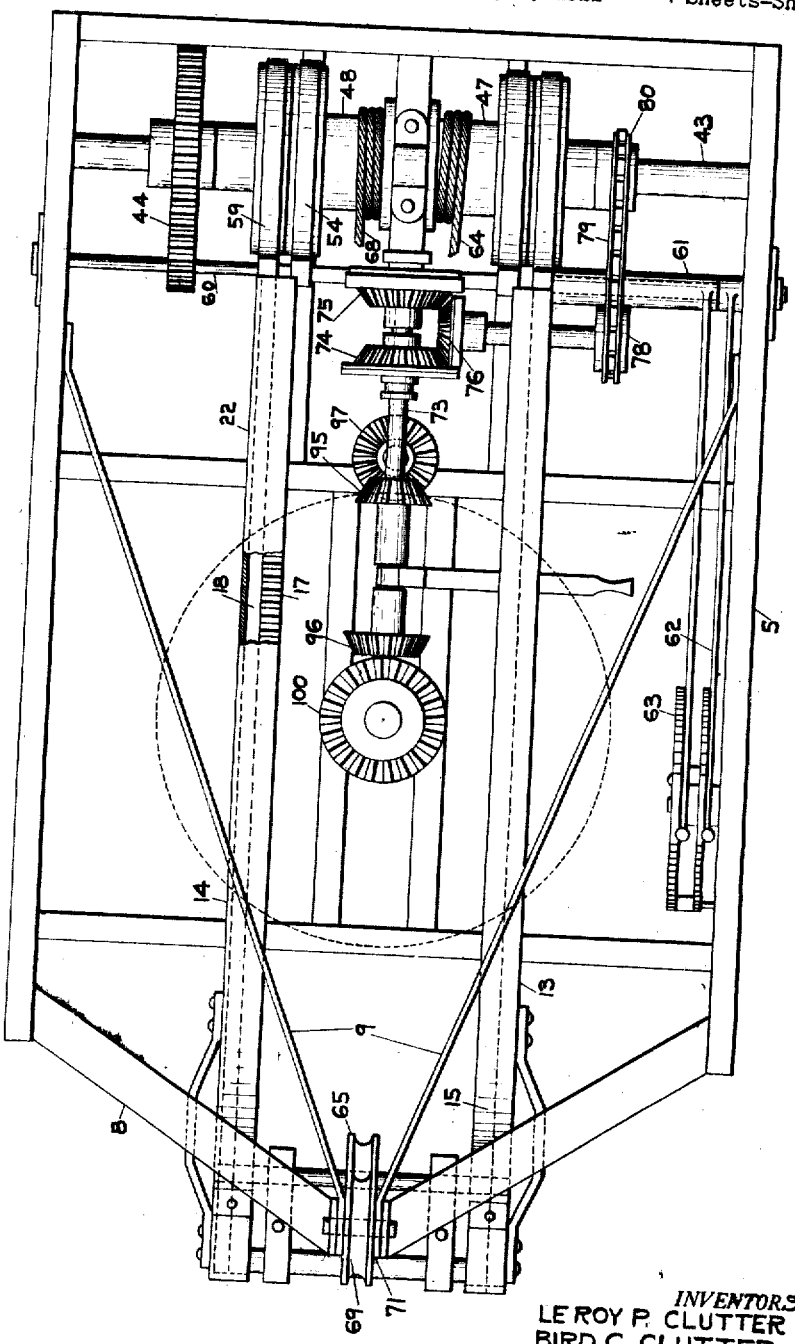
Figure 2 is a top plan view of the machine with parts thereof removed.

Referring in detail to the drawings, 1 denotes the body portion of a truck provided with front wheels 2 and rear wheels 3 of any suitable construction. A large swing gear 4, horiontally disposed, is fixed to the top of the body portion 1.

Pivotally mounted on the truck is the frame structure of the machine, comprising a base of platform 5, vertical members 6, longitudinal top members 7, angularly disposed and converging forward members 8, diagonally extending and converging braces 9 and the vertical braces 10.

The base 5, of the frame structure, is pivotally connected with the body portion 1 of the truck and centrally of the swing gear 4, so as to permit of the frame structure being swung entirely around in either direction upon the truck. The lower face of the base 5 carries a plurality of rollers which travel on a path formed on the swing gear 4, adjacent to its periphery, and which prevent excessive vacillation of the frame structure during the operation of the apparatus.

Fixedly supported centrally in the frame structure, as indicated at 12′, or in any other suitable manner, is a longitudinally extending track 12 comprising a pair of channel members 13 and 14, respectively. The channel members 13 and 14 extend parallel, relatively to each other, and have their forward portions 15 curved upwardly to the top of the frame structure.

The flanges of the channel members 13 and 14 are on the inner faces thereof. The upper face of the marginal edge of each of the lower flanges 16 is provided with a rack 17 and the other portion of the upper face of the flange 16 provides a run-way 18. The rack 17 and run-way 18 extend throughout the entire length of the track 12, and the former projects above the tread of the latter.

Mounted in the track structure is a carriage 19, consisting of a transversely extending axle 20 having a wheel 21 rotatably mounted at each end thereof. The wheels 21 travel on respective run-ways 18 on the lower flanges 16 of the track members 13 and 14.

A propelling gear 23 is fixed to the axle 20 adjacent to each of the wheels 21. These gears 23 are of less diameter than the wheels 21 and mesh with the rack 17 on the lower flange 16 of respective track members 13 and 14. The gears 23 provide a positive propulsion for the carriage 19, forwardly and rearwardly in the track structure for the purpose to be described.

The diameter of the wheels 21 being substantially commensurate to the distance between the lower flange 16 and the upper flange 22, the latter, in conjunction with the elevated rack 17, together with the rear end walls 22′, and the securing rod 23′ connecting the curved forward ends, of the track members 13, 14, will maintain the carriage 19 in proper operating position at all times in the track members 13 and 14, by holding the gear 23 in mesh with the rack 17 of the track members.

Figure 4:
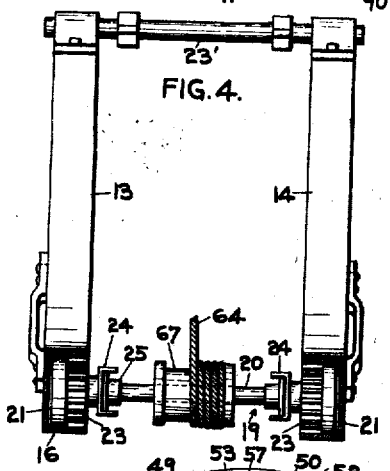
Figure 4 is a rear end view of the track for the scoop arm carriage, the latter being mounted thereon.
Figure 5:
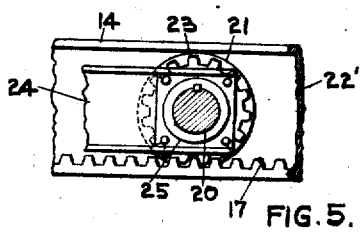
Figure 5 is a fragmentary view of the inner side of one of the track members.
Figure 6:
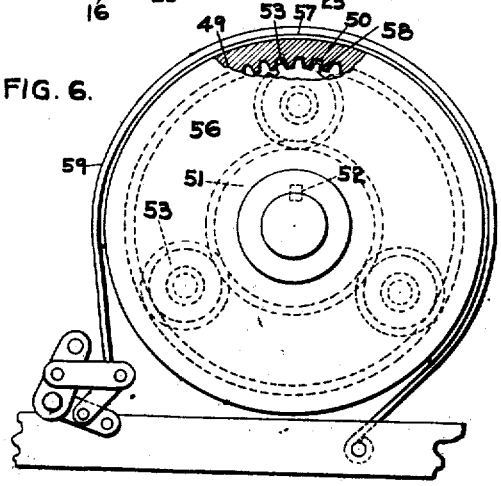
Figure 6 is a side view of the differential housing and gearing for actuating the drums controlling the scoop movements.
Figure 7:
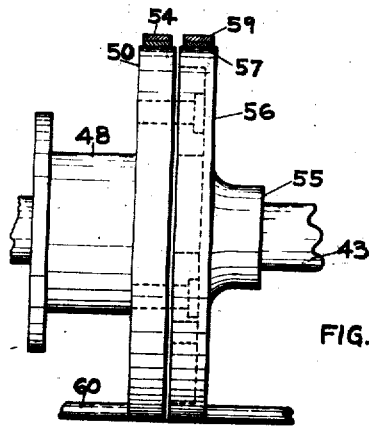
Figure 7 is a rear view of one of the drums and associated parts.
Figure 8:
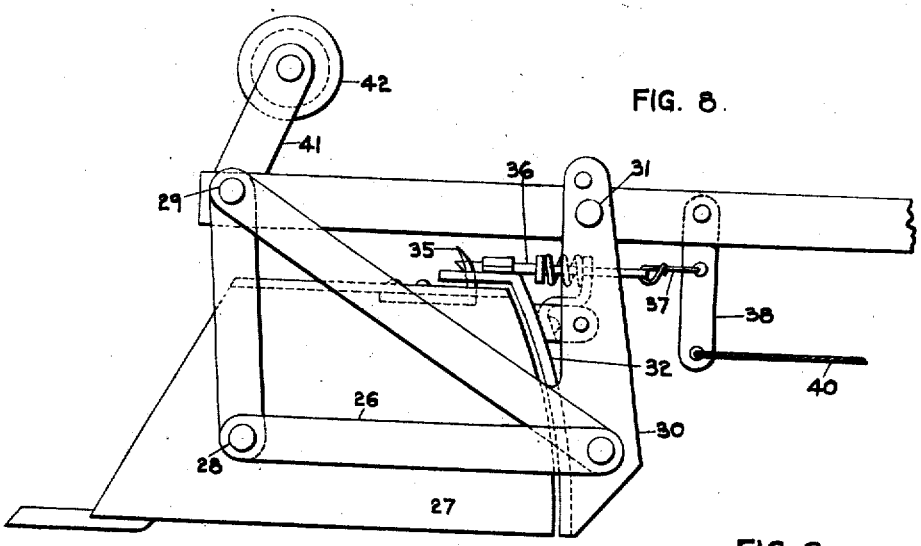
Figure 8 is a side elevation of the scoop in the closed position.
Figure 9:
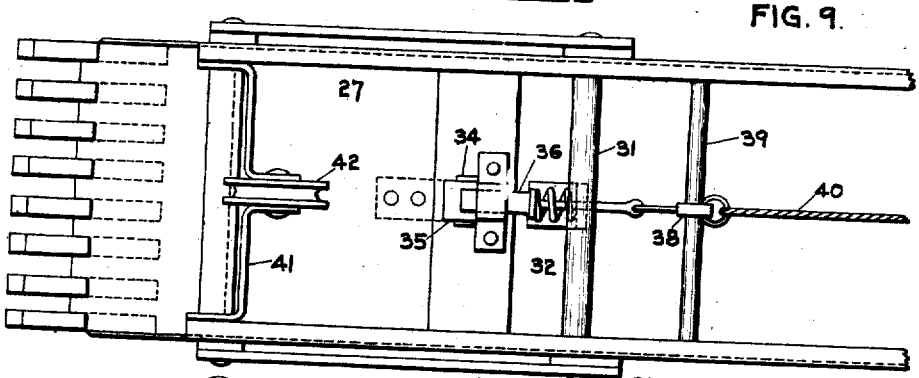
Figure 9 is a top plan view thereof.
Figure 10:
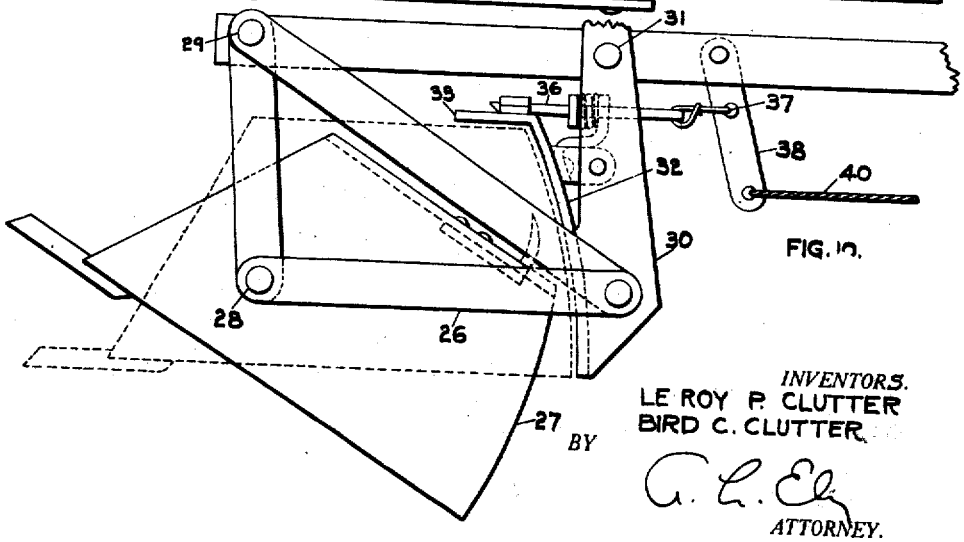
Figure 10 is a side elevation of the scoop in a partially open position.

A pair of elongated members 24 provide a scoop carrying arm or traveling boom extending longitudinally forward between the track members 13 and 14, and have their rear ends loosely or pivotally connected, as at 25, to the axle 20 to permit of the rotation of the latter in said rear ends. The connection of each of the scoop arm members 24 with the axle 20 is adjacent to one of the propelling gears 23, as is clearly shown in Figure 4 of the drawings.

The forward ends of the scoop arm members 24 carry an adjustable frame 26 in which a scoop 27, having a pivotal connection 28, is mounted. The forward end of the frame 26 is pivoted, as at 29, to the extreme forward ends of the scoop arm members 24, while the rear vertical member 30 of the frame 26 has an adjustable connection 31 with the scoop arm members 24. By the adjustment of the connection 31, the angular disposition of the scoop 27, relatively to the scoop arm members 24, may be varied to best meet conditions found in practice.

A plate 32, virtually forming the rear end wall of the scoop 27, is fixedly carried by the frame 26. The pivotal connection 28 being disposed forwardly of the central portion of the scoop 27, the forward end of the latter is over-balanced by the rear end, causing the rear end to drop downwardly during the dumping operation and discharge the material through the open rear end.

To provide a latching element for the scoop 27, the upper portion 33 of the plate 32 is bent forwardly and formed with an aperture 34 for the passage of the apertured catch 35 carried on the top of the scoop 27. A spring controlled latch 36 is mounted on the portion 33, of the plate 32, and normally engages in the apertured catch 35 on the scoop 27 to hold the latter in the closed position. A flexible member 37 connects the latch 36 with the approximate center of a depending trip lever 38, which latter is pivotally mounted, intermediate of the scoop arm members 24, on a transversely supported rod 39.

A trip rope 40, adapted to be manipulated by the operator connects with the lower end of the trip lever 38. By pulling the trip rope 40 the trip lever 38 is actuated to release the latch 36 and permit of the dumping of the scoop 27. The action of the spring controlled latch 36 is such that the locking of the scoop 27 is automatic when the latter is thrown, jolted, jarred or jerked to the closed position in the usual well known manner.

A hanger 41 is pivotally connected to the forward ends of the scoop arm members 24, through the connection 29, and carries a rotatably mounted pulley 42, positioned centrally of said hanger 41 and intermediate of the scoop arm members.

Rotatably mounted as at 43′, at the rear lower end of the frame structure, is a transversely extending shaft 43, which carries a fixed drive gear 44, adjacent to one end thereof, meshing with the pinion 45 of the power motor 46, which latter is fixed in the frame structure in any suitable manner.

A pair of cable drums 47 and 48 are loosely mounted on the shaft 43 and positioned thereon to aline with the space between the track members 13 and 14. Drum 47 controls the scoop projection or retraction, and the drum 48 controls the scoop elevation.

The outer end of each of the drums 47, 48 is integrally formed with a radial flange 49 having a peripheral flange 50 forming a housing, in which a drum operating gear 51 is mounted. The latter is keyed to the shaft 43, as indicated at 52. A series of small gears 53 are rotatably carried by the flange 49 and mesh with the operating gear 51. The periphery of the flange 50 forms a brake drum which is engaged by a brake band 54.

Loosely mounted on the shaft 43, adjacent to each of the drums 47 and 48, is a hub 55 integrally formed with similar flanges 56 and 57 which oppose the flanges 49 and 50 of the drums 47 and 48. The inner face of the flange 57 is provided with gear teeth 58 which mesh with the small gears 53 on the flanges 49 of respective drums 47 and 48. The periphery of the flange 57 forms a brake drum engaged by the brake band 59.

The brake bands 54 and 59, associated with the drum 48, are simultaneously and reversely actuated by the operation of a common shaft 60, that is, when band 54 is tensioned to lock the drum 48 the band 59 is automatically released to permit of the rotation of the associated hub flange 55, or vice versa. In like manner the brake bands 54 and 59, associated with the drum 47, are simultaneously and reversely operable when actuated by the operation of the sleeve 61 through which the shaft 60 extends. Suitable and conveniently located operating levers 62 and 63 are provided to facilitate the actuation of the shaft 60 and the sleeve 61, respectively.

It will here be noted that either of the operating levers 62 and 63 may be shifted to a neutral position to release its associated brake bands 54 and 59, thereby permitting simultaneous rotation of either of the drums 47 or 48 with its cooperating hub flange 57.

The arrangement of the drums 47 and 48, with their respective operating and controling mechanisms, provide a well known differential gearing, permitting of the drums 47 and 48 to be independently rotated in the clockwise direction by power through the drive shaft 43, and in the counter clockwise direction by the weight of the co-acting scoop arm 24 and scoop 27 on their return movements, in a manner hereinafter described.

A cable 64, having one end thereof connected with the drum 47, passes over a sheave 65 which is rotatably mounted, as at 66, centrally of the forward ends of the top members 7 of the frame structure. The other end of the cable 64 is attached to the drum 67 which latter is centrally fixed to the carriage axle 20 to turn therewith.

A cable 68, having one end thereof connected with the drum 48, passes over a sheave 69 rotatably mounted, as at 70, in the vertical projecting ends 71 of the converging forward members 8. The other end of the cable 68 is secured in the link 72 pivoted at 70, after passing through the pulley 42, which latter is connected by the hanger 41 to the forward ends of the scoop arm members 24.

Figure 3:
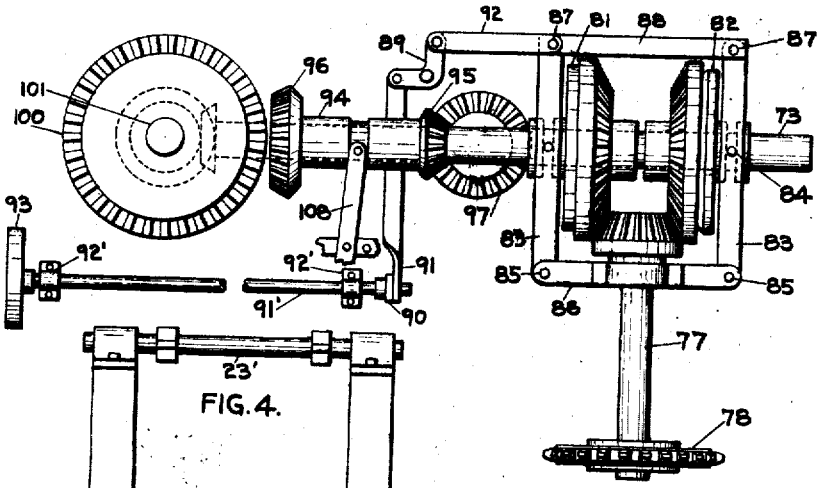
Figure 3 is an enlarged detail view of the traction and swing operating mechanisms.

The traction and swing operating mechanisms, illustrated in Figure 3, of the drawings, include a longitudinally disposed shaft 73 suitably journaled in the frame structure. Loosely mounted on the rear portion of the shaft 73 is a pair of bevel gears 74 and 75, both of which mesh with a bevel pinion 76 fixed on the inner end of the shaft 77, which latter is suitably mounted for rotation in the frame structure. The outer end of the shaft 77 carries a fixed sprocket 78 which is driven through the sprocket chain 79 and the sprocket 80 fixed to the drive shaft 43.

The gears 74 and 75 are provided with respective cone clutches 81 and 82 which are sidably keyed to the shaft 73 to turn therewith. The clutches are shifted by a pair of cross arms 83 centrally pivoted, as at 84, to clutches 81 and 82, respectively. One end of each of the arms 83 has a pivotal connection 85 with respective ends of a fixed bearing member 86, while the other ends thereof are pivotally joined, as at 87, by a connecting bar 88. The arms 83 are actuated by the pivotal interconnecting operating cranks 89 and 90 and bars 91 and 92, the bar 92 connecting with the forward end of the connecting bar 88. A forwardly extending rod 91′ has its rear end fixed in the crank 90 and is mounted for rotation in suitable bearings 92′. A fixed treadle 93, positioned for the convenience of the operator is mounted on the forward end of the rod 91′. When the treadle 93 is depressed in one direction the arms 83 will be moved forwardly and cause the clutch 82 to engage gear 75 and rotate the shaft 73 in the clockwise direction, and when the treadle 93 is depressed in the other direction clutch 81 will actuate gear 74 to drive the shaft 73 in the other direction. The normal level position of the treadle 93 positions both clutches 81 and 82 in the inoperative or neutral position.

Slidably carried on the forward portion of the shaft 73 to rotate therewith, is a sleeve 94 provided with a gear 95 at its rear end and gear 96 at its forward end. The gear 95 is adapted to mesh with a gear 97 mounted at the upper end of a vertical shaft 98 which latter is journalled in the frame structure. The lower end of the shaft 98 carries a pinion 99 in mesh with the large swing gear 4. The function of the gears 95, 97, 98 and 4 is to provide for the swinging of the entire frame structure and associated parts carried thereby, on its pivotal connection with the body portion 1, of the truck, in either direction, as determined by the direction of rotation of the shaft 73 through the operation of the gear 74 or 75.

The gear 96 is adapted to mesh with the gear 100 carried at the upper end of the vertical shaft 101 which forms the center pin pivotally connecting the frame structure with the truck. The lower end of the shaft 101 is provided with a gear 102 meshing with gear 103 on the forward end of the traction shaft 104, which latter is journalled, as at 105, to the under face of the body portion 1 of the truck. The rear end of the shaft 104 carries a gear 106 meshing with a gear 107 fixed to the rear axle of the truck. This gearing transmission provides for the transportation and positioning of the complete machine under its own power.

The sleeve 94 is provided with suitable shifting mechanism 108 to facilitate its operation by the operator. The arrangement of the sleeve 94 with gears 95 and 96 is such that one of said gears is always in mesh with its associated gear. No neutral position of these gears being required as their operation depends on the rotation of the shaft 73, which is actuated only when either of the clutches 81 or 82 is shifted to engage respective gears 74 or 75.

In practise the operation of the apparatus is as follows: Assuming that all parts of the device are in the position shown in Figure 1 of the drawings, the surplus of the cable 64 is being carried and wound on the drum 48. Shaft 43 is running continuously with both drums 47 and 48 inoperatively locked by the brake bands 54 tensioned on their respective drum flanges, while the brake bands 59 are in released position allowing the hubs 55 with their flanges to rotate idly with the shaft 43.

To fill the scoop 27 it must be forced forwardly into the material. To do this, the rotating hub 55 with flange gearing 58 cooperating with the drum 47 is stopped and locked by tensioning its brake band 59, during which operation the drum 47 is automatically released to permit its rotation. The drum 47 now rotating, and being connected with the carriage drum 67 by the cable 64, the latter will unwind from the drum 67 and wind onto the drum 47. During this unwinding operation of the cable 64, the carriage axle 20 carrying the drum 67, must necessarily rotate, causing the carriage 19 to travel forwardly in the track 12 due to the gears 23 in mesh with the racks 17. Upon movement of the carriage 19 in forward direction the scoop arm 24, connected thereto and carrying the scoop 27, will force the latter into the material and fill the same. During this filling operation, the scoop 27 may be kept at the same level while being forced forwardly by slightly releasing the brake band 54, locking the drum 48, and allowing the cable 68 to play out very slowly to keep scoop 27 at its proper level.

After the filling operation, the scoop 27 is elevated to the dumping position by first arresting further forward movement thereof. Upon adjusting brake bands 54 and 59, controlling the drum 48, to permit of rotation of the latter in a manner identical to that above described relative to the drum 47, the cable 68 will wind upon the drum 48 and elevate the forward end of the scoop arm 24 and the scoop 27 carried thereby. If desired the scoop 27 may be elevating during the filling operation by rotating the drum 48, while the scoop 27 is being forced forwardly by the operation of the drum 47.

While the scoop 27 is elevating the same may be advanced or retracted to properly project the scoop 27, by actuating the carriage 19 which latter may be moved up the curved portions of tracks 15 all the way to the top of the frame structure to a maximum dumping elevation. By operating clutches 81 or 82 the entire frame structure including scoop 27 may be swung around on the truck to position the scoop in the dumping position. By releasing the latch 36 the scoop is dumped after which it is again locked in the closed position in the manner hereinbefore stated.

The return of the scoop 27 and arm 24 to their original or lowered position is accomplished by their own weights when the drums 47 and 48 are released to play out their respective cables 64 and 68, by shifting the operating levers 62 and 63 to their neutral positions to simultaneously release the brake bands 54 and 59 controlling the movements of the drums 47 and 48 and their associated hub flanges 57, due to the fact that the cable 68 constantly exerts a rearward pull when arms 24 are projected, thereby retracting the latter when drum 47 is released.

As the carriage 19 may be drawn forwardly in the track 12 until it reaches the top of the curvilinear portion 15, and due to the length of the scoop arm 24, the scoop 27 may be projected to an unusually high dumping elevation.

Our improved apparatus having no fixedly pivoted projecting boom, as used in the ordinary power shovels, it enables the operation of the machine extremely close to the work or excavation.

The structural arrangement of the apparatus makes it a comparatively compact, light and very powerful device of its kind which may be readily and conveniently manipulated by the operator to properly function under the most adverse conditions found in practice.

From the foregoing description taken in connection with the accompanying drawings, the advantages of the construction and the method of operation will be readily apparent to those skilled in the art to which the invention appertains, and while describing the principle of operation of the invention together with the device which is now considered to be the best embodiment thereof, it is to be understood that the device shown is merely illustrative and that various changes in the form, proportion and the minor details of construction may be resorted to without departing from the principle or sacrificing any of the advantages of the invention as defined in the appended claims.

What is claimed is:

1. A machine for the purpose set forth comprising a portable portion, a scoop or shovel, an arm connected to and extending rearwardly therefrom into said body portion, a carriage including a drum, a track supporting the carriage upon which the carriage is bodily shifted and rotated during its travel, said arm pivoted at its rear end on said carriage, and means winding off the drum for shifting said carriage forwardly on said track whereby the arm with the scoop is projected forwardly of said body portion.

2. A machine for the purpose set forth comprising a portable body portion, a scoop or shovel, an arm connected to and extending rearwardly therefrom into said body portion, a carriage including a drum, a track supporting the carriage upon which the carriage is bodily shifted and rotated during its travel, said arm pivoted at its rear end on said carriage, means winding off the drum for shifting said carriage forwardly on said track whereby the arm with the scoop is projected forwardly of said body portion, and means for elevating the arm at various inclinations with respect to the body portion.

3. In a machine for the purpose set forth, an arm, a scoop or shovel fixed to the outer ends of said arm, a track, a carriage travelling on the track and having the rear end of said arm pivoted thereon and including a rotatable drum, a pulling member winding off the drum for shifting the latter to project the arm outwardly, and a pulling member connected to the scoop for positioning the arm at an inclination.

4. A machine for the purpose set forth comprising a portable body portion, a scoop or shovel, an arm connected to and extending rearwardly therefrom into said body portion, a carriage including a drum, a track supporting the carriage upon which the carriage is bodily shifted and rotated during its travel, said arm pivoted at its rear end on said carriage, means winding off the carriage for shifting said carriage forwardly on said track whereby the arm with the scoop projected forwardly of said body portion, said track having its forward portion curvilinear.

5. A machine for the purpose set forth comprising a portable body portion, a scoop or shovel, an arm connected to and extending rearwardly therefrom into said body portion, a carriage including a drum, a track supporting the carriage upon which the carriage is bodily shifted and rotated during its travel said arm pivoted at its rear end on said carriage, means winding off the carriage for shifting said carriage forwardly on said track whereby the arm with the scoop is projected forwardly of said body portion and means for elevating the arm at various inclinations with respect to the body portion, said track having its forward portion curvilinear.

6. In a machine for the purpose set forth, a scoop arm, a scoop or shovel fixed onto the outer end of said arm, a track, a rotatable carriage travelling on the track and having the rear end of said arm pivoted thereon, said track and carriage having co-acting means to provide for the rotation of the carriage during the travel thereof, a pulling member winding off the carriage for shifting it outwardly on said track to project the arm outwardly, and a pulling member connected to the scoop or free end of arm for positioning the arm at an inclination, said track having its forward portion curvilinear.

7. In a machine for the purpose set forth, a body portion, a track supported therein and having its rear end position between the center and rear end of the body portion, a rotatable carriage travelling on said track and initially positioned at the rear end thereof, a forwardly extending arm pivoted at its rear end on said carriage, a scoop or shovel on the outer end of said arm, and means winding off the carriage for shifting the carriage whereby the arm is projected forwardly of the body portion, said carriage and track having co-acting means to cause the rotation of the carriage during the shifting thereof, said arm normally disposed at a downward inclination with respect to the track, and means for positioning said arm at various inclinations with respect to the track.

8. A machine for the purpose set forth comprising a portable body portion, a scoop or shovel, an arm connected to and extending rearwardly therefrom into said body portion, a rotatable travelling carriage, a track supporting the carriage and having means co-acting with said carriage to provide for the rotation of the carriage during the travel thereof, said arm pivoted at its rear end on said carriage, and means winding off the carriage for shifting said carriage forwardly on said track whereby the arm with the scoop is projected forwardly of said body portion, and said carriage and track having associated means to maintain the carriage on the track.

9. A machine for the purpose set forth comprising a portable body portion, a scoop or shovel, an arm connected to and extending rearwardly therefrm into said body portion, a rotatable travelling carriage, a track supporting the carriage and having means co-acting with said carriage to provide for the rotation of the carriage during the travel thereof, said arm pivoted at its rear end on said carriage and means winding off the carriage for shifting said carriage forwardly on said track whereby the arm with the scoop is projected forwardly of said body portion, means for elevating the arm at various inclinations with respect to the body portion, and said carriage and track having associated means to maintain the carriage on the track.

10. A machine for the purpose set forth comprising a portable body portion, a scoop or shovel, an arm connected to and extending rearwardly therefrom into said body portion, a rotatable travelling carriage, a track supporting the ends of the carriage and having means co-acting with said ends to provide for the rotation of the carriage during the travel thereof, said arm pivoted at its rear end on said carriage, means winding off said carriage for shifting said carriage forwardly on said track whereby the arm with the scoop is projected forwardly of said body portion and means for elevating the arm at various inclinations with respect to the body portion, said track having its forward portion curving upwardly, and said carriage and track having associated means to maintain the carriage on the track.

11. A machine for the purpose set forth comprising a track, means for angularly adjusting said track on a vertical axis, a rotatable and shiftable carriage travelling on said track; said track and carriage having co-acting means to provide for the rotation of the carriage during the travel thereof, means for shifting the carriage forwardly causing thereby the rotation thereof, an arm having its rear end connected to the carriage whereby when the carriage is shifted the arm will be carried therewith, and a scoop or shovel on the outer end of said arm.

12. A machine for the purpose set forth comprising a track, a rotatable and shiftable carriage travelling on said track, said track and carriage having co-acting means to provide for the rotation of the carriage during the travel thereof, means winding off said carriage for shifting it forwardly causing thereby the rotation thereof, an arm having its rear end connected to the carriage whereby when the carriage is shifted the arm will be carried therewith, and a scoop or shovel on the outer end of said arm, the connection between the arm and carriage being a pivotal one, and means for elevating and lowering said arm.

13. A machine for the purpose set forth comprising a track, a rotatable and shiftable carriage travelling on said track, said track and carriage having co-acting means to provide for the rotation of the carriage during the travel thereof, means for shifting the carriage forwardly causing thereby the rotation of the carriage, an arm having its rear end connected to the carriage whereby when the carriage is shifted the arm will be carried therewith, and a scoop or shovel on the outer end of said arm, the connection between the arm and carriage being a pivotal one, and means for elevating and lowering said arm, said carriage being adapted to be shifted rearwardly by the weight of the scoop and arm as these latter are lowered.

14. A machine for the purpose set forth comprising a track, a rotatable and shiftable

134 carriage travelling on said track, said track and carriage having co-acting means to provide for the rotation of the carriage during the travel thereof, means for shifting the carriage forwardly causing thereby the rotation of the carriage, an arm having its rear end connected to the carriage whereby when the carriage is shifted the arm will be carried therewith, and a scoop or shovel on the outer end of said arm, the connection between the arm and carriage being a pivotal one and means for elevating and lowering said arm, said carriage shifted rearwardly by the weight of the scoop and arm as these latter are lowered, said track having its forward portion curvilinear.

15. In a machine for the purpose set forth, a portable swinging body portion, a scoop or shovel arm normally disposed at its rear end normally positioned at the rear of said body portion, a track supported within the body portion and extending rearwardly on the latter, a rotatable carriage mounted on the track and having the rear end of the arm pivotally connected therewith and capable when shifted forwardly to project the arm forwardly of the body portion, a scoop or shovel on the outer end of the arm, means to provide for the rotation of the carriage during the shifting thereof, means winding off the carriage for shifting said carriage forwardly, means for elevating and lowering said arm and operating means for the carriage shifting means and the arms elevating and lowering means, said operating means arranged at the rear of the said body portion.

16. A machine for the purpose set forth, comprising a track formed of a pair of opposed and spaced track members each channel shape in cross section, each of said members provided with gear teeth and a run-way, a carriage having its ends provided with wheels travelling on the run-way and further provided with gears engaging with said teeth, a scoop or shovel arm operating between said track members and pivotally connected at its rear end to said carriage, a scoop or shovel connected to the outer end of said arm, and means for shifting the carriage on the track to project the arm forwardly.

17. A machine for the purpose set forth, comprising a track formed of a pair of opposed and spaced track members, each channel shape in cross section, each of said members provided with gear teeth and a run-way, a rotatable and travelling carriage having its ends provided with wheels travelling on the run-way and further provided with gears engaging said teeth, a scoop or shovel arm operating between said track members and pivotally connected at its rear end to said carriage, a scoop or shovel connected to the outer end of said arm, means winding off the carriage between the track members to rotate it and for shifting the carriage on the track to project the arm forwardly, and means connected to the arm or shovel for elevating and lowering said arm.

18. A machine for the purpose set forth, comprising a track formed of a pair of opposed and spaced track members each channel shape in cross section, each of said members provided with gear teeth and a run-way, a carriage having its ends provided with wheels travelling on the run-way and further provided with gears engaging with said teeth, a scoop or shovel arm operating between said track members and pivotally connected at its rear end to said carriage, a scoop or shovel connected to the outer end of said arm and means for shifting the carriage winding off the carriage between the track members to project the arm forwardly, said carriage adapted to be shifted rearwardly by the weight of the arm as the latter is lowered.

19. In a machine for the purpose set forth a portable and swinging body portion, a scoop or shovel carrier having its rear end normally positioned at the rear of said body portion, a track supported within the body portion and extending from the rear thereof forwardly, a rotatable carriage traveling on said track and having the rear end of the carrier pivotally connected therewith and adapted when shifted forwardly to project the carrier forwardly of the body portion, a scoop or shovel secured to the outer end of the carrier, said carriage including a drum, means winding off the drum for rotating and shifting said carriage forwardly, and means for elevating and lowering the carrier, said track having its forward portion curvilinear, said carriage being adapted to be shifted rearwardly by the weight of the carrier as the latter is lowered.

20. In a machine for the purpose set forth, a carrier, a scoop or shovel on the outer end of said carrier, a track, a rotatable carriage travelling on the track and having the rear end of said carrier pivoted thereon and including a drum, a pulling member mounted on and winding off the drum for rotating and shifting the carriage to project the carrier outwardly, and a pulling member connected to the carrier for positioning the carrier at an inclination.

21. In a power shovel, a body portion, a track supported therein, a projectable and retractable scoop or shovel carrier, and rotatable means travelling on the track for shifting the carrier, said means having as a part thereof a power operated drum for operating said carrier.

22. A machine for the purpose set forth comprising a portable body portion, a support mounted thereon and angularly adjustable about a vertical axis with respect thereto, means for adjusting said support, a track mounted on and projecting forwardly from said support, a scoop or shovel arranged forwardly of the body portion, a carrier supporting said scoop on one end thereof, a carriage travelling on said track and having the other end of said carrier pivotally connected thereto, and a windable element connected with and shifting the carriage outwardly on said track whereby the carrier is projected from said body portion carrying the scoop therewith.

23. A machine for the purpose set forth comprising a portable body portion, a support mounted thereon and angularly adjustable with respect thereto, means for adjusting said support, a track mounted on and projecting forwardly from said support, a scoop or shovel arranged forwardly of the body portion, a carrier having its outer end supporting said scoop a carriage travelling on said track and having the inner end of said carrier pivotally connected thereto, and a windable element connected with and shifting the carriage outwardly on said track whereby the carrier is projected from said body portion carrying the scoop therewith, and means mounted on said support for elevating said carrier, and said track providing means for the return of said carriage to normal position by the downward swinging of the carrier as the latter is released from elevated position.

24. An excavator comprising a frame having its top projected forwardly of its bottom, a track including a straight portion and an upwardly curved portion, said straight portion supported by the bottom of the frame and said curved portion projected beyond the bottom of the frame and connected with the forward end of the top of the frame, a carrier of greater length than the straight portion of the track, a rotatable carriage travelling on and having gear connections with said track and having the rear end of the carrier pivotally connected therewith, a frame work depending from the outer end of said carrier, a dumping scoop or shovel including a fixed and a pivoted section carried by the frame work, and pulling means winding from and off the carriage for shifting the carriage causing thereby the rotation thereof and the projecting of said carrier forwardly.

25. An excavator comprising a frame having its top projected forwardly of its bottom, a track including a straight portion and an upwardly curved portion, said straight portion supported by the bottom of the frame and said curved portion projected beyond the bottom of the frame and connected with the forward end of the top of the frame, a carrier of greater length than the straight portion of the track, a rotatable carriage travelling on and having gear connections with said track and having the rear end of the carrier pivotally connected therewith, a frame work depending from the outer end of said carrier, a dumping scoop or shovel including a fixed and a pivoted section carried by the frame work, and pulling means winding from and off the carriage for shifting the carriage causing thereby the rotation thereof and the projection of said carrier forwardly, said carrier normally depending at an inclination with respect to said frame, and a windable element supported by the frame for elevating and lowering the carrier.

26. An excavator comprising a frame having its top projected forwardly of its bottom, a track including a straight portion and an upwardly curved portion, said straight portion supported by the bottom of the frame and said curved portion projected beyond the bottom of the frame and connected with the forward end of the top of the frame, a carrier of greater length than the straight portion of the track, a rotatable carriage travelling on and having gear connections with said track and having the rear end of the carrier pivotally connected therewith, a frame work depending from the outer end of said carrier, a dumping scoop or shovel including a fixed and a pivoted section carried by the frame work, and pulling means winding from and off the carriage for shifting the carriage causing thereby the rotation thereof and the projecting of said carrier forwardly, said carrier normally depending at an inclination with respect to said frame, a windable element supported by the frame for elevating and lowering the carrier, a portable support for said frame and means for angularly adjusting said frame on a vertical axis with respect to said support.

27. In a power shovel, the combination of a scoop or shovel, a track, a carrier for the scoop or shovel, a shaft, a drum and a gear secured on said shaft along said track, said track having a rack for engaging with said gear, said carrier pivotally connected with said shaft, and means for revolving said drum to project said carrier and scoop.

28. A machine for the purpose set forth comprising a portable body portion, a scoop or shovel, a carrier connected to and extending rearwardly therefrom into said body portion, a rotatable travelling carriage, a track for supporting said carriage and provided with means co-acting with the carriage to rotate the latter during the travel thereof, said carrier having its rear end pivotally mounted on said carriage, and means winding off the carriage to rotate it and cause the travel thereof forwardly to project the carrier and scoop.

29. A machine for the purpose set forth comprising a portable body portion, a scoop

214 MATERIAL OR ARTICLE HANDLING
134 or shovel, a carrier connected to and extending rearwardly therefrom into said body portion, a rotatable travelling carriage, a track for supporting said carriage and provided with means co-acting with the carriage to rotate the latter during the travel thereof, said carriage having its rear end pivotally mounted on said carriage, and means winding off the carriage to rotate it and cause the travel thereof forwardly to project the carrier and scoop or shovel, said carriage including a drum from which said means winds off to provide for the rotation and travel of the carriage.

30. A machine for the purpose set forth comprising a track having a rack and a run-way thereon, a carriage travelling on the run-way and having a gear meshed with said rack, a scoop or shovel arm pivoted at its inner end on said carriage, a scoop or shovel on the outer end of said arm, and means for operating said gear to shift said carriage on said track.

31. A machine for the purpose set forth comprising a track having a pair of spaced rails, a rack coextensive with said rails, a carriage having means at each end for traveling on each rail a gear on said carriage meshing with said rack, a scoop arm pivoted on said carriage so as to extend between said rails and means for operating said gear to project said scoop arm forwardly or rearwardly between said rails.

32. A shovel comprising a frame, a track mounted on the frame and formed with a horizontal portion and with a forward upwardly directed portion, a carriage traveling on said track, a shovel carrier pivoted onto the carriage, said carriage being movable up the upwardly directed portion of said track to elevate the pivot of said carrier above said horizontal portion of the track.

33. A shovel comprising a frame, a track in the frame extending forwardly in the frame and then upwardly, and a traveling shovel carrier having a pivotal mounting movable on the track both forwardly and then upwardly to elevate the pivot of said carrier.

34. A revoluble shovel including a platform revoluble about a center, a track on said platform extending from the rear forwardly over said center, a shovel carrier movable over said track, and power means for operating said shovel carrier mounted on said platform to the rear of said center.

35. A revoluble shovel comprising a platform revolvable about a center, a boom for carrying a shovel, said boom being pivoted on a mounting movable from the rear of said platform over said center, and power means for moving said mounting, said power means being mounted on said platform to the rear of said center.

36. In a revoluble shovel machine, a travelling boom carried on a pivot movable forwardly from adjacent the center of said machine, and means for operating said boom substantially all of which is rearwardly of said center.

37. A revoluble shovel comprising a revoluble frame, a shovel carrying boom telescoping into the frame and pivoted on its inner end, and means for projecting said boom out of said frame adapted to move the pivot thereof forwardly from over the center of the frame, said means being disposed rearwardly of the center of said frame.

38. A revoluble shovel comprising a revoluble frame, a shovel carrying boom telescoping into the frame over the center and pivoted on its inner end, and means for shifting the pivot of said boom to initially project said boom out of said frame and subsequently to elevate the pivot of said boom at the forward end of said frame.

In testimony whereof we affix our signatures.

LE ROY P. CLUTTER.
BIRD C. CLUTTER.

Certificate of Correction.

It is hereby certified that the name of the assignee in Reissue Letters Patent No. 16,107, granted July 7, 1925, upon the application of Le Roy P. Clutter, of Washington, Pennsylvania, and Bird C. Clutter, of Akron, Ohio, for an improvement in "Power Shovels," was erroneously written and printed as "George W. Wagner," whereas said name should have been written and printed as *George E. Wagner*, as shown by the records of assignments in this office; and that the said Letters Patent should be read with this correction therein that the same may conform to the record of the case in the Patent Office.

Signed and sealed this 1st day of September, A. D. 1925.

[SEAL.]

KARL FENNING,
*Acting Commissioner of Patents.*